March 22, 1960  P. F. K. ERBGUTH ET AL  2,929,392
PNEUMATIC SYSTEM WITH DIAPHRAGM-OPERATED FEEDBACK UNIT
Filed March 26, 1956  4 Sheets-Sheet 1
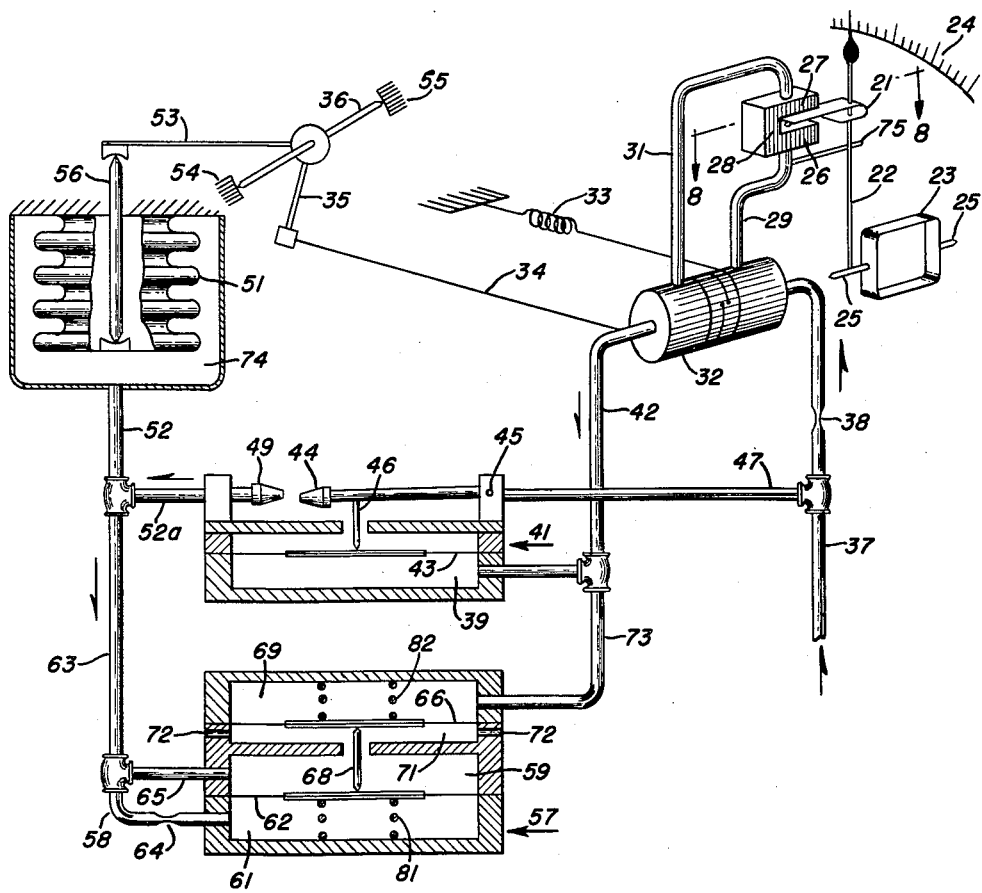
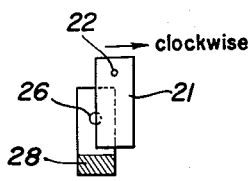
PAUL F. K. ERBGUTH and
STANLEY M. VAN PELT
INVENTORS
BY
ATTORNEY PAUL F. K. ERBGUTH and
STANLEY M. VAN PELT
INVENTORS BY
Rudolph J. Jurick
ATTORNEY

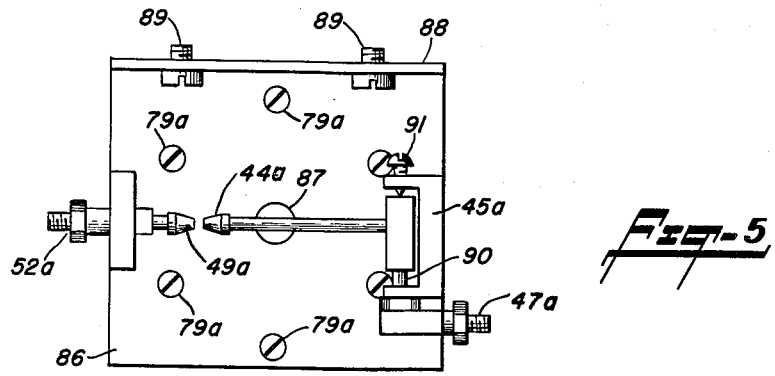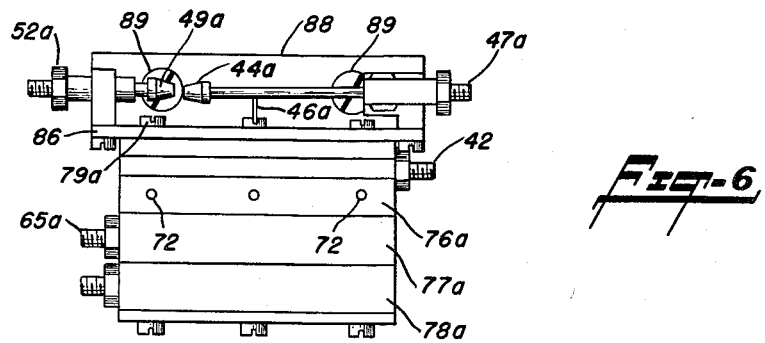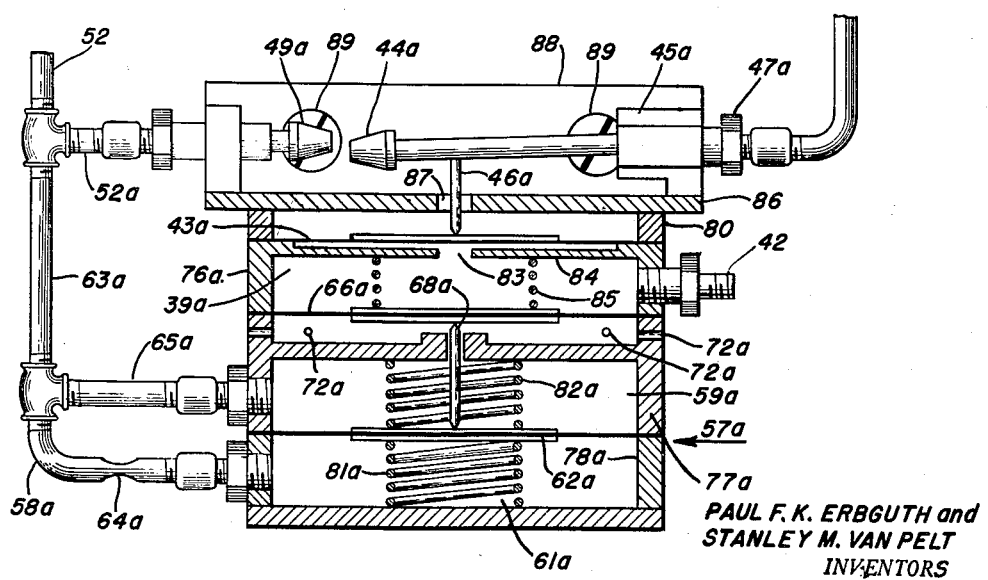

United States Patent Office 2,929,392
Patented Mar. 22, 1960

1

2,929,392

PNEUMATIC SYSTEM WITH DIAPHRAGM-OPERATED FEEDBACK UNIT

Paul F. K. Erbguth, Great Neck, N.Y., and Stanley M. Van Pelt, Nixon, N.J., assignors, by mesne assignments, to Daystrom, Incorporated, Murray Hill, N.J., a corporation of New Jersey Application March 26, 1956, Serial No. 573,943

12 Claims. (Cl. 137—86)

This invention relates to pneumatic systems wherein changes in a variable condition cause corresponding variations in air pressure to effectuate the operation of indicating, recording and/or other control means, and more particularly to a novel diaphragm-operated feedback unit from which an output signal is returned in proper phase relation to the system, to prevent oscillations and increase system stability.

Our novel feedback device is adapted for use generally in pneumatic systems but the following description will be restricted to such device forming part of a pneumatic follow-up system. A system of this class comprises a device sensitive to changes in a variable condition as, for example, an electrical instrument having a pointer operable over a scale and actuated by electrical energy, or a pivoted beam unbalanced by changes in weight, humidity or the like. The movement of such a condition-sensing device alters the position of a vane in a stream of low pressure air passing between axially aligned nozzles. The variation of the air pressure in the receiving nozzle actuates an air relay which, in turn, produces a corresponding pressure variation in a relatively high pressure air system. Such variation in the air pressure output of the relay is utilized to actuate suitable mechanism to provide a measurement and/or record of the instantaneous state of the condition, or to effect the control of the condition at a selected point.

The system is self-balancing, in that any change in the variable condition results in a corresponding follow-up action to maintain the vane substantially in its initial, or throttling, position in the air stream. In general, any follow-up system may be subject to cycling or hunting at the balancing point due to the time lag between changes in the input signal and the effect of the follow-up action.

An object of this invention is to increase the stability of a pneumatic system responsive to changes in a variable condition by the provision of a diaphragm-operated feedback unit that is responsive to the rate of change of the condition.

An object of this invention is the provision of a pneumatic system responsive to changes in a variable condition and including a bellows actuated in accordance with variations in the output air pressure of an air relay, and a diaphragm-operated feedback unit pneumatically coupled to the bellows, said feedback unit being arranged to develop an air pressure change opposed to that resulting in the initial actuation of the bellows.

An object of this invention is the provision of a pneumatic system responsive to changes in a variable condition and comprising an air relay actuated upon changes in the condition to produce a corresponding pressure variation in an air line, a bellows movable in response to the pressure variations in said line, a housing containing a diaphragm dividing it into two chambers, means pneumatically connecting said chambers differentially to said bellows, another chamber containing a feedback diaphragm mechanically connected to said first-mentioned

2 diaphragm, and an air line connected between the feedback diaphragm chamber and the air relay, said feedback diaphragm causing air pressure variations in its chamber opposed to those which actuate the air relay.

An object of this invention is the provision of a pneumatic system responsive to changes in a variable condition and comprising a sensing member movable in accordance with changes in the condition, axially-aligned discharge and receiving nozzles, means normally maintaining a low pressure air stream between said nozzles, a vane actuated by the sensing member to inhibit more or less the quantity of air passing to the receiving nozzle, a bellows controlled by an air relay, an auxiliary housing divided by a first diaphragm into two chambers, said chambers being differentially coupled to said bellows, another chamber containing a second diaphragm driven by said first diaphragm, and an air line for feeding in proper phase relationship to the low pressure side of the air relay the output signal of the second diaphragm, in order to eliminate system oscillations and increase system stability.

An object of this invention is the provision of pneumatic apparatus comprising a housing partitioned to form a lower and an upper chamber, a first diaphragm dividing the lower chamber into two sub-chambers, air lines communicating with each of said sub-chambers one of the air lines including an air restriction, a second diaphragm dividing the upper chamber into two sub-chambers one of which communicates with the atmosphere, means mechanically coupling together the two diaphragms, an air relay mounted on the housing and including an operating chamber, means forming an air passage-way between the operating chamber of the air relay and the other sub-chamber of the said upper chamber, and means for pneumatically coupling the operating chamber of the air relay to a source of variable air pressure.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

Figure 1 is a diagrammatic view, with parts in section, of a pneumatic system embodying our invention;

Figure 5 is a plan view, drawn to a larger scale, of the combination relay and feedback unit shown in Figure 4;

Figure 6 is a side elevational view of the combination illustrated in Figure 5;

Figure 7 is an enlarged view of the device shown in Figures 5 and 6, with the lower portion shown in section; and Figure 8 is a horizontal sectional view taken on line 8—8 of Figure 1, in the direction of the arrows.

Figure 2:
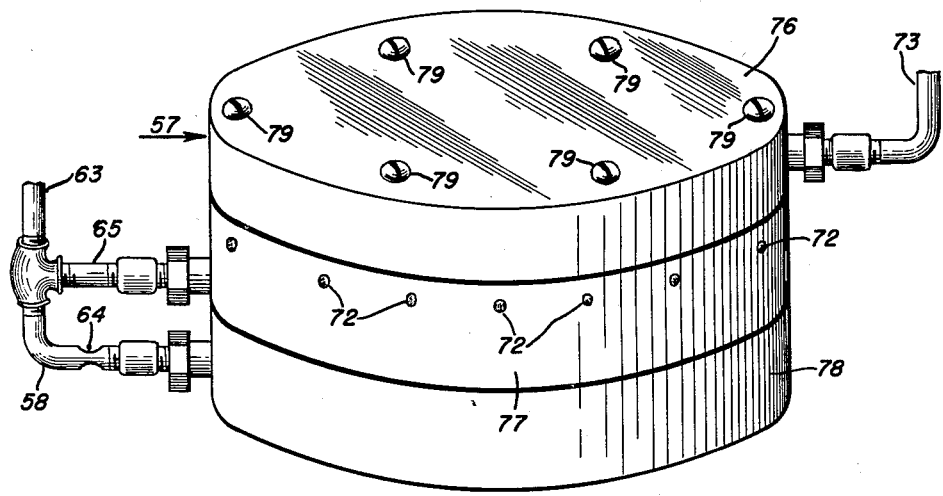
Figure 2 is a perspective view, drawn to a larger scale, of the feedback unit shown in Figure 1.

In the instrument illustrated in Figure 1, which includes a self-balancing system involving mechanism for sensing changes in a variable condition, there is shown a vane 21 carried by a lever 22 (which in this instance is the pointer of a low torque sensing device, for example, a sensitive electrical instrument such as a millivoltmeter), and movable over a suitable scale 24. This figure being a diagrammatic representation there is shown only the movable coil 23 mounted on pivots 25. Those skilled in the art will understand that the movable coil is mounted for angular rotation in a uni-direction magnetic flux gap and that hair springs are provided whereby the coil is held in a given or zero position until an electrical current is passed therethrough. Such current, may, for example, be generated by a thermocouple serving as a temperature measuring device in a furnace (not shown).

The follow-up mechanism comprises a pair of axially-aligned nozzles, namely, a supply or discharge nozzle 26 and a receiving nozzle 27. Said nozzles are desirably held permanently in axial alignment by being formed in a unitary block 28 with which communicates a supply tube 29 and an outlet tube 31. These nozzles form a pneumatic couple and are mounted for rotation coaxially with respect to the pivots 25 of the instrument. The nozzles are desirably carried by a coupling member 32 mounted for rotation on pivots (not shown). The coupling member 32 is biased in a given direction as by means of a return spring 33 having one end secured to a relatively fixed surface and the other end attached to a flexible wire entwined about and secured to the coupling member. A similar wire 34 has one end entwined about and fastened to the coupling member 32 and the other end fastened to a rigid arm or crank 35 on a shaft 36.

The construction of the coupling member 32 so as to effect a transfer of air from the discharge nozzle to the receiving nozzle, while permitting free rotation of the coupling member, is described in the co-pending application of P. F. K. Erbguth, Serial No. 492,930, filed March 8, 1955, and entitled "Pneumatic Follow-up System" now Patent No. 2,838,028, issued June 10, 1958.

Air under pressure from the supply tube 37, including a flow-reducing restrictor 38, is supplied from the discharge nozzle 26 to the receiving nozzle 27, except as inhibited by the vane 21. The receiving nozzle 27 is connected to the actuating chamber 39 of an air relay 41 by the tubes 31 and 42, such chamber being closed by a diaphragm 43. It will be apparent that the diaphragm will move in response to changes in the air pressure within the tube 42, as determined by the quantity of air passing to the receiving nozzle 27.

The air relay 41 may be of conventional construction and is here shown as comprising a nozzle 44 pivoted at 45 and connected to the relay diaphragm 43 by a link 46. Air under pressure from the tube 37 is supplied to the nozzle tube 44 through a tube 47. It may here be pointed out that the air supplied to the relay nozzle 44 has a pressure in the range of pounds per square inch to effect a positive operation of suitable follow-up mechanism, as will be described in detail hereinbelow. On the other hand, the pressure of the air supplied to the rotatable discharge nozzle 26 is very low, that is, not more than three inches of water, thereby reducing to a minimum any reaction between the air stream and the vane 21 carried by the low torque sensing device.

Cooperating with the pivoted nozzle 44 of the air relay 41 is a fixed receiving nozzle 49 communicating with a relatively large or drive bellows 51 through tube 52. The bottom of this bellows 51 is mechanically coupled to a crank 53 extending from the shaft 36, pivoted in suitable bearings 54 and 55, as by means of a connecting rod 56. The shaft 36 also carries the crank or arm 35 which is connected to the coupling member 32 by means of wire 34 for rotating the same against the bias of the spring 33.

Associated with the bellows 51 is a pneumatic feedback device generally identified by the numeral 57. Such feedback device comprises a housing, made of metal, plastic or other suitable material, partitioned to form upper and lower chambers as shown. The lower chamber is divided by a flexible diaphragm 62 into sub-chambers 59 and 61 which sub-chambers are pneumatically coupled to the main bellows 51 by the tube 63. One branch, tube 58 of the tube 63 includes a flow restrictor 64 whereas the other branch tube 65 is unrestrictedly connected to the sub-chamber 59. The diaphragm 62 is mechanically connected to a diaphragm 66, disposed in the upper chamber of the housing, as by means of the connecting rod 68. The diaphragm 66 divides said upper chamber into sub-chambers 69 and 71, the latter being open to the atmosphere through ports 72. On the other hand, the sub-chamber 69 is connected to the low pressure air line 42 (and, consequently, to the operating chamber 39 of the air relay) by a tube 73.

The operation of the system will now be described. It will be assumed to be in balance, under which condition the trailing edge of the vane 21 is disposed substantially in the center of the air stream between the aligned nozzles 26 and 27 as shown in Figure 8. Upon an upscale movement of the pointer 22, that is, clockwise as viewed in Figure 1, the vane will be moved further out of the air stream, whereupon the air pressure in the tubes 31, 42 and in the air relay chamber 39 is increased. Such an increase in air pressure results in an upward deflection of the relay diaphragm 43, thereby moving the nozzle 44 into closer alignment with the associated fixed nozzle 49. This results in an increase in the air pressure within the chamber 74 surrounding the bellows 51 causing an upward expansion of that bellows. Inasmuch as this bellows is mechanically linked to the shaft 36 by the connecting rod 56 and crank 53, there results a positive corresponding clockwise rotation of the shaft 36 against the bias of the spring 33 of the coupling member 32. The clockwise rotation of the arm 35 increases the tension on the wire 34, thereby rotating the coupling member 32 against the force of the return spring 33 in a clockwise direction until the vane is overtaken and it is again substantially in an initial, or throttling, position within the air stream, that is, where a new balance is obtained.

A down-scale movement of the pointer 22 results in a decrease of pressure in the tube 31 and a reverse operation, whereby the arm 35 rotates counter-clockwise and the wire 34 causes a counter-clockwise rotation of the aligned nozzles so that they follow the pointer 22. In order to prevent movement of the vane 21 beyond the air stream on a downscale deflection of the pointer, a suitable stop 75 is secured to the tube 29.

The actuation of the main bellows 51, that is, upward expansion as previously described, is modified by the simultaneous operation of the feedback unit 57. The increase in the air pressure within the tube 63 is immediately effective in the sub-chamber 59, whereas the effect of such air pressure increases in the associated sub-chamber 61 is delayed due to the flow restrictor 64 in the line 58. Consequently, there is established a momentary pressure differential in the sub-chambers 59, 61 causing the dividing diaphragm 62 to move downwardly. Such downward movement of the diaphragm 62 results in a corresponding downward movement of the diaphragm 66, by means of the link 68. The resulting increase in the volume of sub-chamber 69 effectively decreases the air pressure within the tube 73 and the operating chamber of the air relay 41. It will be noted that the change in air pressure in the air relay chamber brought about by operation of the feedback device is opposite to that which initiated operation of the air relay in the first instance. Such momentary feedback action tends to smooth out air pressure variations in the tube 52 and thereby prevents system oscillation and increases system stability. As is apparent, the feedback action is momentary in character and is effective until the air pressure equalizes in the sub-chambers 59 and 61. The ports 72 permit air to enter into and escape from the sub-chamber 71 upon movement of the diaphragm 66.

Figure 3:
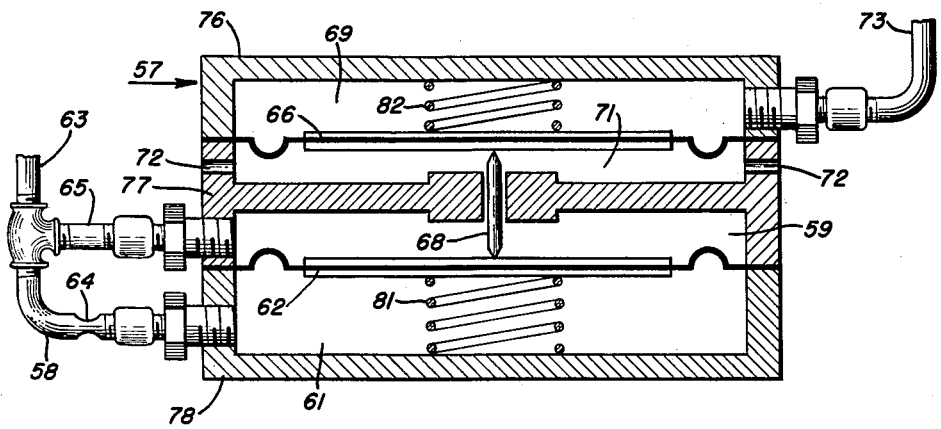
Figure 3 is a vertical axial sectional view of the feedback unit of Figure 2.

Reference is now made to Figures 2 and 3, for the structural details of the feedback unit 57. The feedback unit is formed by three cup-like members 76, 77 and 78, fastened together as by means of screws 79 and clamping the peripheral portions of the diaphragms 62 and 66 therebetween, as shown most clearly in Figure 3. The members 77 and 78 form therebetween the lower chamber which is divided into the "free" sub-chamber 59 and the "restricted" sub-chamber 61. The resiliency of the diaphragm 62 is desirably supplemented by an underlying helical spring 81 which thereby also helps to support the connecting rod 68 which transmits motion between the diaphragms 62 and 66.

The diaphragm 66 likewise divides the upper chamber into an upper or low pressure sub-chamber 69 which serves for feedback purposes, and a lower or "atmospheric" sub-chamber 71 which communicates with the atmosphere through ports 72. Disposed between the upper surface of the diaphragm 66 and the lower surface of the upper housing member 76 is a helical spring 82, causing the lower surface of said diaphragm 66 to always contact with the upper end of the connecting rod 68, so that motion is always transmitted between said diaphragms upon the movement of either one. The clearance between the rod 68 and the wall of the member 77 through which it passes is so small that no appreciable leakage occurs along said rod. As in Figure 1, air from the air relay nozzle is brought directly into the free air sub-chamber 59 through tubes 63 and 65, while such air is brought into the restricted sub-chamber 61 through tube 63, restrictor 64 and tube 58. Air pressure variations in the sub-chamber 69 are communicated to the operating chamber of the relay 41 through tube 73.

Figure 4:
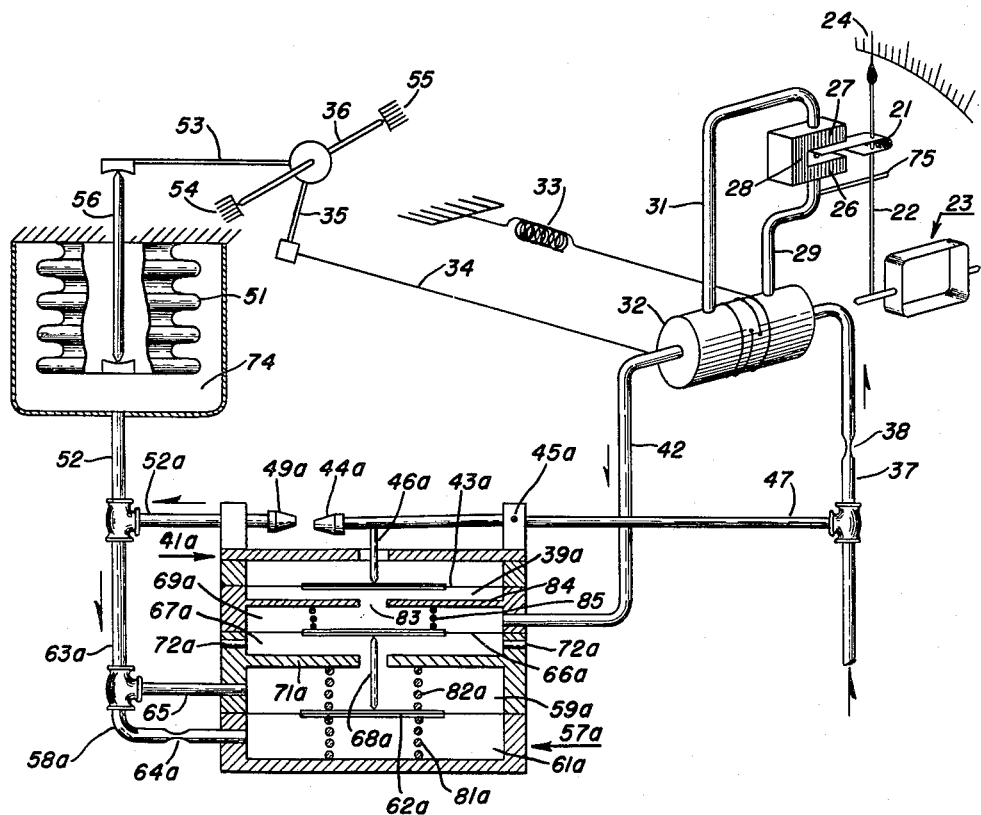
Figure 4 is a diagrammatic view corresponding to Figure 1, but showing a modification of the invention.

Another embodiment of the invention is shown in Figure 4. The system here shown is of the follow-up type similar to that shown in Figure 1 and corresponding parts are identified by similar reference numerals. In the Figure 4 arrangement the feedback unit and the air relay are combined to form a single device thereby resulting in a saving of space and the elimination of the connecting tube between the operating chamber of the air relay and the feedback unit. Air under pressure from supply tube 37, including restrictor 38, is supplied from the discharge nozzle 26 to the receiving nozzle 27, except as inhibited by the vane 21. The receiving nozzle is connected to the chamber 39a of the air relay portion 41a of the relay and feedback combination 57a, through the tube 42, the sub-chamber 69a and opening 83 as contrasted with the preceding embodiment in which the air relay is independent of the feedback assembly. Here again, the operating chamber of the air relay is closed by a flexible diaphragm 43a like the diaphragm 43 of the preceding embodiment. It will be apparent that the diaphragm 43a will move in response to changes in the air pressure within the tube 42, as determined by the movement of the vane 21 in the air stream between the aligned nozzles 26, 27.

The air relay portion 41a is here shown as comprising a nozzle 44a pivoted at 45a and connected to the relay diaphragm 43a by a link or rod 46a. Air at relatively high pressure from the supply tube 37 is supplied to the nozzle 44a through a tube 47. It is here again pointed out that the air supplied to the relay nozzle 44a desirably is under a pressure in the range of pounds per square inch to effect a positive operation of suitable follow-up mechanism, whereas the pressure of the air supplied to the rotable discharge nozzle 26 is desirably very low, that is, not more than three inches of water, thereby reducing to a minimum any reaction between the air stream and vane 21 carried by the movable coil 23 of low torque sensing device. Cooperating with the pivoted nozzle 44a the air relay portion 41a is a fixed receiving nozzle 49a communicating with the main or drive bellows 51 through air line or tube 52.

The feedback unit 57a consisting of the lower part of the combination device shown in Figure 4, is similar to the feedback unit 57 shown in Figure 1 with the following exceptions. In the Figure 4 embodiment there are shown two springs 81a and 82a disposed on opposite sides of the diaphragm 62a. These springs maintain the diaphragm in a normal position except as modified by air pressure variations in the subchambers 59a and 61a.

Further, by reason of the opening 83, the operating chamber of the air relay portion now includes the sub-chamber 69a.

Reference is now made to Figures 5, 6 and 7 for structural details of the combination air relay and feedback unit. Such combination comprises three circular, cup-like members 76a, 77a, and 78a secured together as by means of screws 79a and clamping the peripheral portions of diaphragms 62a and 66a therebetween, as shown most clearly in Figure 7. The members 77a and 78a form the lower chamber which is divided into an upper, or "free" sub-chamber 59a and a lower, or "restricted" sub-chamber 61a by the diaphragm 62a. This diaphragm is biased to a normal position by the helical springs 81a and 82a and the diaphragm is mechanically coupled to the diaphragm 66a by the link or rod 68a. The coiled spring 85 serves to maintain 66a in contact with the rod 68a at all times. The clearance between the rod 68a and the wall of the member 77a through which it passes is so small that no appreciable leakage occurs along said rod. As in the preceding embodiment, the sub-chambers 59a and 61a are pneumatically connected to the main bellows by the tube 63a, a restrictor 64a being inserted into the branch tube 58a going to the sub-chamber 61a.

As shown in Figure 7, the peripheral edge portion of the air relay diaphragm 43a is secured between the upper edge of the housing member 76a and a gasket 80 as by means of screws 79a, see also Figures 5 and 6. Such screws 79a also secure a rectangular cover plate 86 to the housing member 76a. The plate 80 closes the upper portion of the housing except for the central opening 87 through which extends the connecting rod 46a from the pivoted nozzle 44a. The nozzle 44a may be pivotally secured to the cover plate 86 by a mounting 45a, said nozzle being secured to a hollow hub to receive air from the tube 47a through a hollow journal 90 at one end. The other end of the hub is engaged by an adjusting screw 91. Cooperating with the pivoted nozzle 44a is a receiving nozzle 49a mounted in fixed position at the opposite side of the cover plate and adapted to transmit air to the tube 52a. The cover plate 86 may also serve as a mounting plate for the entire device by providing an upstanding flange 88 at one side and adapted to receive the mounting screws 89.

Air pressure changes brought about by a movement of the vane 21 (see Figure 4) from its initial throttling position in the air stream are immediately transmitted to the operating chamber of the air relay through the line 42. Such air pressure changes are of relatively low order since the pressure of the air stream, within which the vane operates, is of the order of 3 inches of water. The air relay diaphragm 43a, Figure 7, is of the sensitive class motionally responsive to such relatively low air pressure changes, whereas the diaphragms 62a and 66a of the feedback unit are stiffer so as to be unresponsive to air pressure changes of such low magnitude. Thus, if it be assumed that the edge of the vane moves further out of the air stream (upscale movement of the pointer) there occurs an increase in the air pressure within the operating chamber of the air relay, an upward flexing of the diaphragm 43a, and a slight clock-wise rotation of the air relay nozzle 44a. As the nozzle 44a moves into closer alignment with the cooperating fixed nozzle 49a, there occurs an increase in the air pressure within the line 52a that is connected to the main bellows 51 and the sub-chambers 59a and 61a. By reason of the restrictor 64a, inserted in the line 58a leading to the sub-chamber 61a, there is a momentary increase of air pressure within the sub-chamber 59a relative to that in sub-chamber 61a and the diaphragm 62a flexes downwardly. This permits the diaphragm 66a also to flex downwardly. Such downward flexing of the diaphragm 66a, which is unrestricted by reason of ports 72a, effectively increases the volume of the operating chamber of the air relay which has the net effect of decreasing the air pressure in such operating chamber. The air relay diaphragm 43a, therefore, momentarily flexes downwardly thereby moving the pivoted nozzle 44a toward its initial position relative to the fixed nozzle 49a. Thus there is provided a momentary negative feedback action that is effective only until the air pressure in the sub-chambers 59a and 61a is equalized.

Those skilled in this art will understand that the time duration of the feedback action may be controlled by the degree of air flow restriction provided in the line to one or the other of the sub-chambers 59a and 61a. To assure positive simultaneous movement of the air relay diaphragm 43a and the feedback diaphragms 62a and 66a, a small helical spring may be disposed between the upper surface of the diaphragm 43a and the housing, as for example, the spring 82 shown in Figure 3.

From the foregoing description it will be seen that we have provided a novel feedback unit for effectively preventing undesirable oscillations in a pneumatic system and thereby increasing operating stability of the system as a whole. Such feedback unit may comprise a separate device for use with any conventional air relay or, alternatively, the air relay and feedback unit may be combined into a single unitary arrangement.

While the drawings show conventional flow restrictors in certain of the air lines it will be apparent that the restrictors may take the form of adjustable valves or may be inserts of reduced-diameter tubing.

Having now described our invention in detail in accordance with the requirements of the patent statutes those skilled in this art will have no difficulty making changes and modifications in the individual parts of their relative assembly in order to meet specific requirements. Such changes and modifications may be made without departing from the scope and spirit of the invention as set forth in the following claims.

We claim:

1. A pneumatic system comprising a member movable in response to changes in a variable condition and producing corresponding air pressure variations in an air line, an air relay having an operating chamber connected to said air line, said air relay producing corresponding air pressure variations in a second air line, a first chamber divided by a first diaphragm into two sub-chambers, means pneumatically coupling said sub-chambers to the second air line, an air flow restrictor interposed between the second air line and one of said sub-chambers, a second diaphragm disposed in a second chamber and mechanically coupled to the first diaphragm, and means pneumatically coupling said second chamber to the operating chamber of the air relay.

2. A pneumatic system comprising a member movable in response to changes in a variable condition and producing corresponding air pressure variations in an air line, an air relay having an operating chamber connected to said air line, said air relay producing corresponding air pressure variations in a second air line; a pair of axially-aligned sub-chambers formed by a dividing flexible diaphragm, means pneumatically connecting one of said axially aligned sub-chambers to the second air line, means pneumatically connecting the other axially aligned sub-chamber to the second air line through an air flow restriction, a connecting member movable in accordance with the movement of said flexible diaphragm; and a feedback chamber volumetrically controlled by a flexible diaphragm mechanically coupled to said connecting member, said feedback chamber being pneumatically coupled to the air relay.

3. In a self-balancing pneumatic system of the type comprising an air stream flowing between a discharge nozzle and an axially-aligned receiving nozzle, a vane movable in the air stream to vary the air pressure in a first air line connected to the receiving nozzle, an air relay having an operating chamber connected to the first air line, said relay correspondingly varying the air pressure in a second air line, and mechanism responsive to the air pressure variations in the second air line to maintain the vane at a predetermined position in the air stream; the improvement comprising a primary diaphragm disposed in a primary chamber and dividing said chamber into two sub-chambers, means pneumatically connecting the said sub-chambers to the second air line, an air-flow restrictor interposed between the second air line and one of said sub-chambers, a secondary diaphragm disposed in a secondary chamber and dividing such chamber into two sub-chambers one of which communicates with the atmosphere, means mechanically coupling the secondary diaphragm to the primary diaphragm, and means pneumatically coupling the other sub-chamber of the secondary chamber to the operating chamber of the air relay.

4. An assembly for use in a pneumatic system including an air relay having an operating chamber connected to a first air line, said relay correspondingly varying the air pressure in a second air line, said assembly comprising a housing having an upper chamber and a lower chamber closed to the atmosphere and formed therein, a first flexible diaphragm dividing the lower chamber into two sub-chambers, means to pneumatically connect said sub-chambers to said second air line, a second flexible diaphragm dividing the said upper chamber into two sub-chambers one of which is open to the atmosphere, means to pneumatically connect the other sub-chamber of the upper chamber to said first air line, and means mechanically coupling the first diaphragm to the second diaphragm.

5. The invention as recited in claim 4, including a passageway formed between the upper and lower chambers and wherein the means mechanically coupling the first diaphragm to the second diaphragm comprises a rod extending through said passageway and having ends engaging the diaphragms.

6. The invention as recited in claim 5, including spring means biasing the said first diaphragm to a predetermined normal position.

7. The invention as recited in claim 6, including an air relay carried by the housing, said air relay including an operating chamber communicating with the said other sub-chamber of the upper chamber.

8. A device for use in a pneumatic system comprising a lower cup-like member, an upper cup-like member and an intermediate member, means securing the said members together thereby forming a housing containing axially-aligned lower and upper chambers; a first flexible diaphragm peripherally secured between the intermediate member and the lower cup-like member, said diaphragm dividing the lower chamber into two sub-chambers; means forming individual air passageways between each sub-chamber and the exterior of the housing; a second flexible diaphragm peripherally secured between the intermediate member and the upper cup-like member, said diaphragm dividing the upper chamber into two sub-chambers; means forming individual air passageways between the exterior of the housing and each of the sub-chambers formed in the upper chamber; and means mechanically connecting the said diaphragms for simultaneous flexing in response to air pressure variations in any one of the said sub-chambers.

9. The invention as recited in claim 8, wherein the said intermediate member includes a central opening extending therethrough, and the means connecting the diaphragms comprises a rod extending through the said central opening and having its ends in engagement with the diaphragms.

10. A device for use in a pneumatic system comprising a lower housing member having a cylindrical recess formed therein; an intermediate housing member having axially-aligned cylindrical recesses formed in opposite surfaces and a central aperture communicating with said recesses; an upper housing member having a cylindrical recess formed therein, said housing member having an axial hole formed therein which communicates with the cylindrical recess; means securing the housing members together to form a housing such that the said cylindrical recesses form axially-aligned upper and lower chambers; a first flexible diaphragm peripherally clamped between the intermediate and lower housing members and dividing the said lower chamber into two sub-chambers; a second flexible diaphragm peripherally clamped between the intermediate and upper housing members and dividing the said upper chamber into two sub-chambers, means forming individual air passageways between the exterior of the housing and each of the four sub-chambers; a rod slidably extending through the central aperture in the intermediate housing member and having its ends in engagement with the first and second diaphragms; a mounting plate secured to an end of the housing and spaced from the upper housing member, said plate having an opening extending therethrough; a third flexible diaphragm peripherally secured to the housing and disposed within the space formed between said mounting plate and the upper housing member; a first nozzle having one end pivotally secured to the mounting plate; a cooperating nozzle secured to the mounting plate; and a connecting link member extending through the opening in the mounting plate and having its ends connected to the said third diaphragm and the said first nozzle.

11. The invention as recited in claim 10, including spring means biasing the first diaphragm to a predetermined normal position.

12. The invention as recited in claim 10, including spring means normally biasing the said second diaphragm toward the first diaphragm.

References Cited in the file of this patent

UNITED STATES PATENTS

| | | |
|---|---|---|
| 2,333,044 | Rosch | Oct. 26, 1943 |
| 2,512,561 | Ziegler | June 20, 1950 |
| 2,526,972 | Ray | Oct. 24, 1950 |
| 2,635,581 | Karig | Apr. 21, 1953 |
| 2,638,911 | Griswold | May 19, 1953 |
| 2,675,819 | Eckman et al. | Apr. 20, 1954 |
| 2,712,321 | Grogan | July 5, 1955 |
| 2,767,725 | Long | Oct. 23, 1956 |
| 2,774,367 | Grogan | Dec. 18, 1956 |